United States Patent
Flesch

(10) Patent No.: US 7,688,194 B2
(45) Date of Patent: Mar. 30, 2010

(54) SECONDARY ELECTRIC CIRCUIT SYSTEM AND METHOD

(76) Inventor: James Flesch, 2687 Imperial Hills Dr., Tucker, GA (US) 30084-2824

(*) Notice: Subject to any disclaimer, the term of this patent is extended or adjusted under 35 U.S.C. 154(b) by 260 days.

(21) Appl. No.: 11/805,324

(22) Filed: May 23, 2007

(65) Prior Publication Data

US 2007/0290820 A1 Dec. 20, 2007

Related U.S. Application Data

(60) Provisional application No. 60/814,948, filed on Jun. 19, 2006.

(51) Int. Cl.
*B60Q 1/44* (2006.01)
*B60Q 1/22* (2006.01)
*B60Q 1/26* (2006.01)

(52) U.S. Cl. .......... 340/479; 340/463; 340/467; 340/468

(58) Field of Classification Search .......... 340/467, 340/479
See application file for complete search history.

(56) References Cited

U.S. PATENT DOCUMENTS

| | | | | |
|---|---|---|---|---|
| 5,172,095 A | * | 12/1992 | Scott | 340/479 |
| 6,744,359 B1 | * | 6/2004 | Wasilewski et al. | 340/467 |
| 6,867,692 B2 | * | 3/2005 | Weatherspoon | 340/479 |
| 6,982,648 B2 | * | 1/2006 | Cros et al. | 340/641 |

* cited by examiner

*Primary Examiner*—Benjamin C Lee
*Assistant Examiner*—Andrew Bee

(57) ABSTRACT

A secondary brake light illumination circuit useful for storing excess power applied to a primary vehicle brake light illumination circuit during activation thereof and subsequently selectively discharging stored power to secondary illumination devices to provide a temporary decorative or informational display.

15 Claims, 4 Drawing Sheets

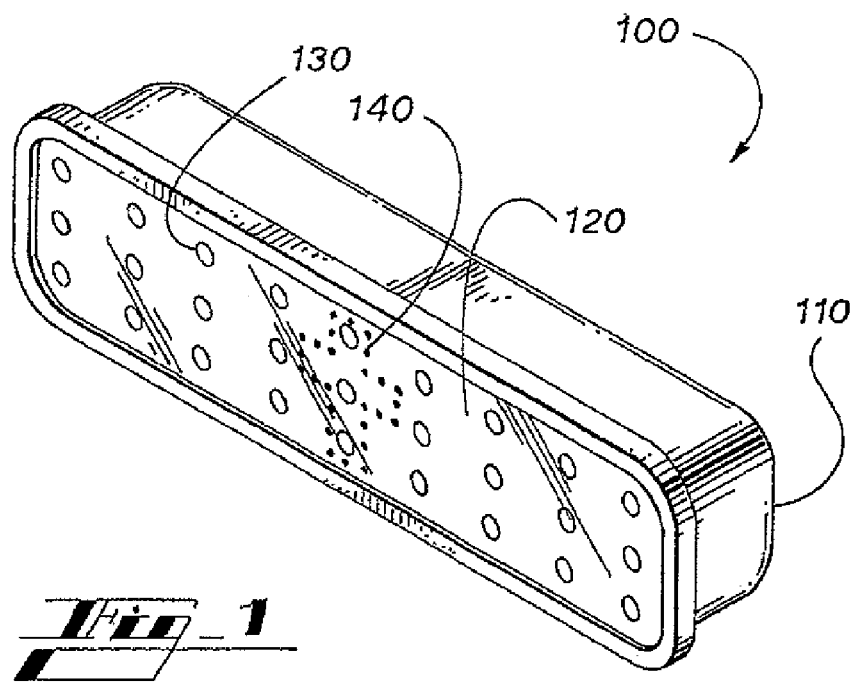
Fig_1
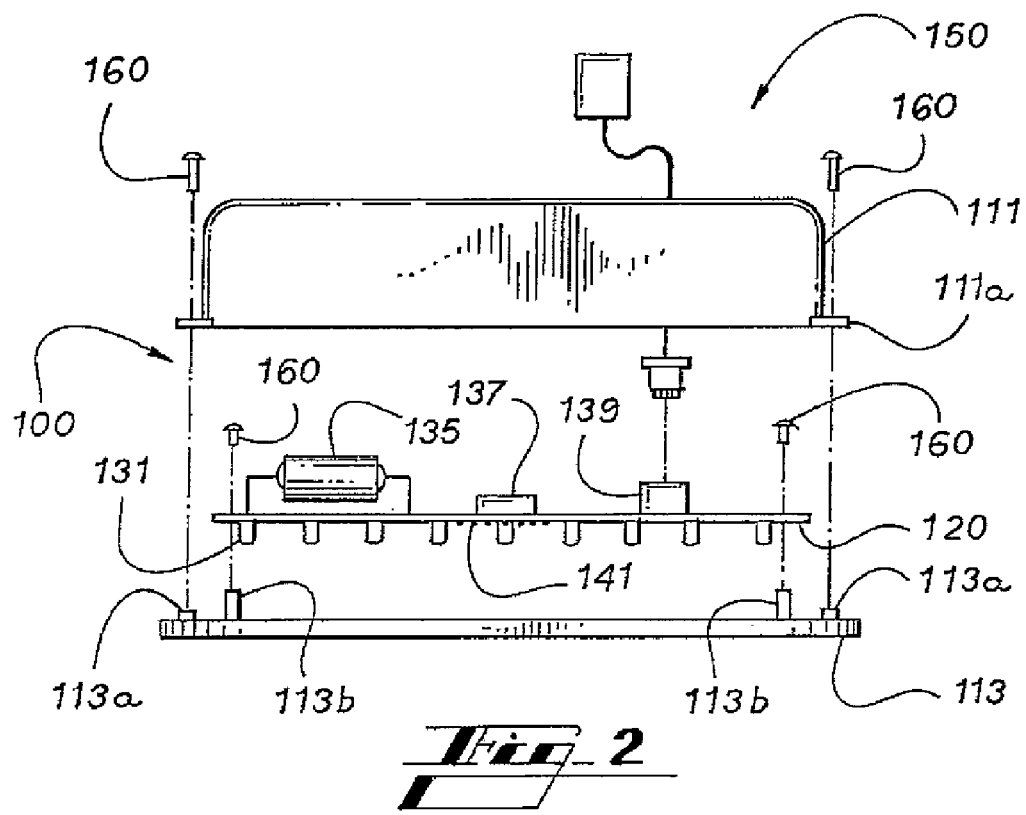
Fig_2

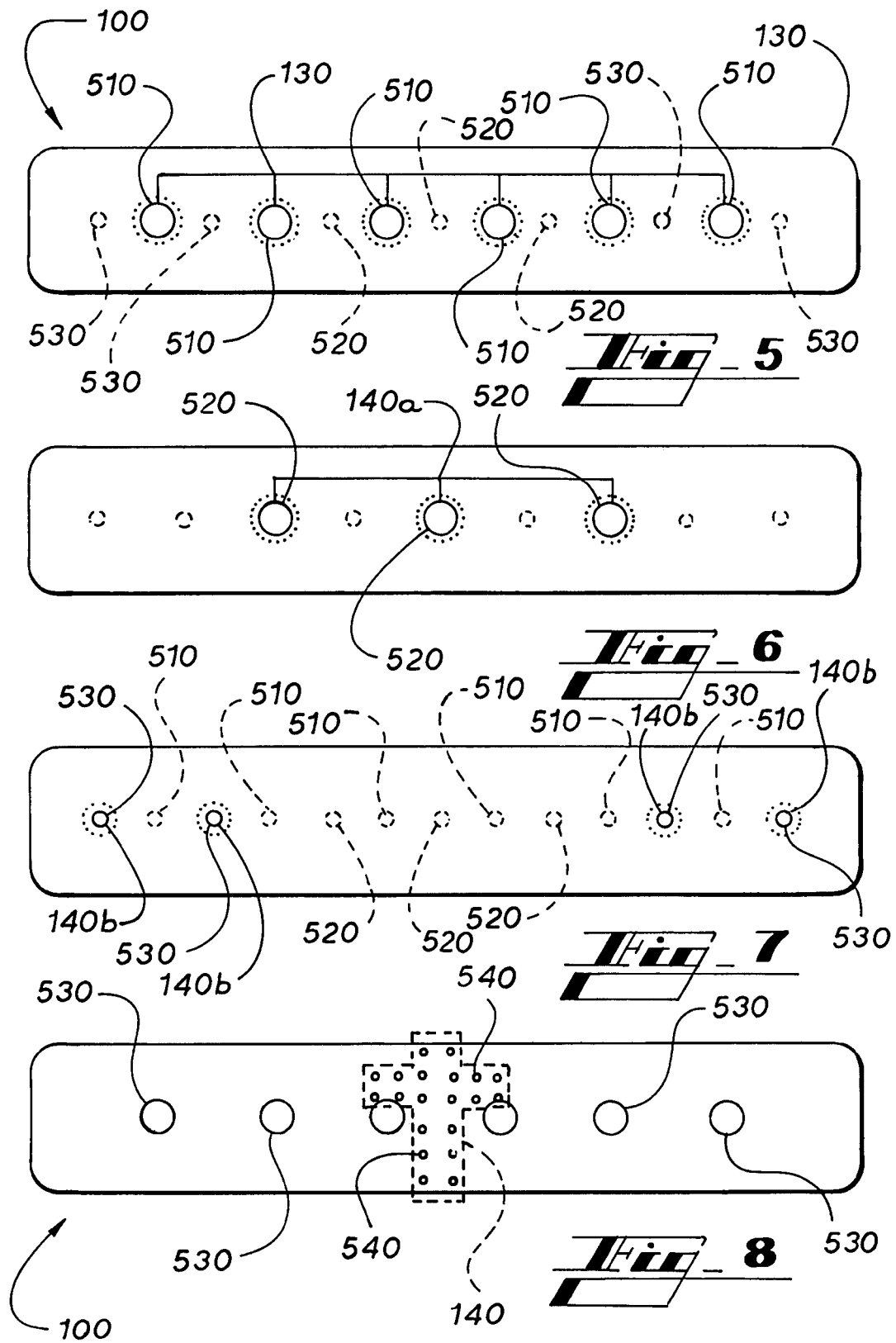

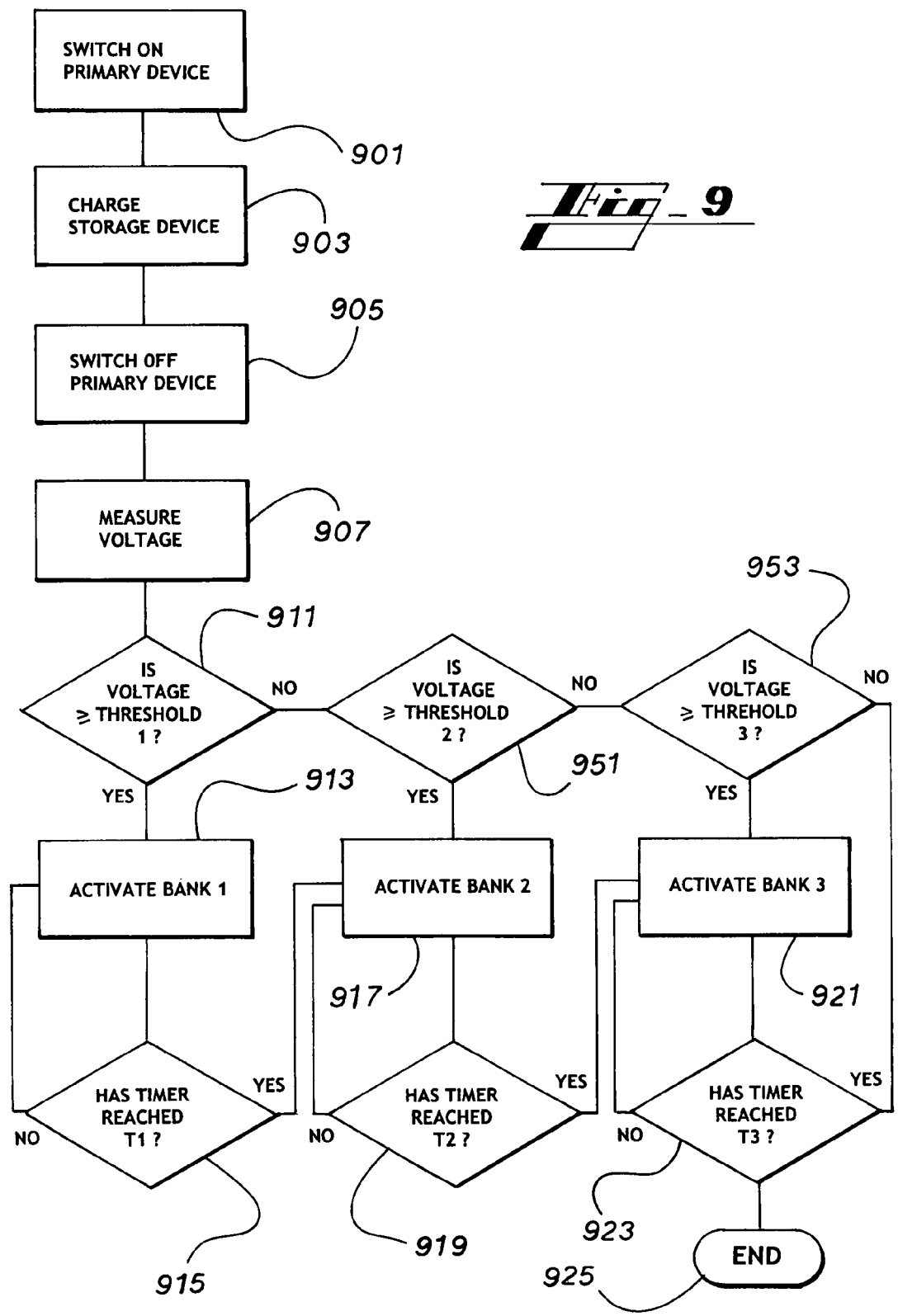

SECONDARY ELECTRIC CIRCUIT SYSTEM AND METHOD

PRIORITY CLAIM TO RELATED APPLICATIONS

To the fullest extent permitted by law, the present non-provisional patent application claims priority to and the full benefit of U.S. Provisional Patent Application Ser. No. 60/814,948, filed Jun. 19, 2006, entitled "Secondary Vehicular Brake Illumination, or 'Ghost CHMSL'".

TECHNICAL FIELD

The present invention relates generally to switched electric devices, and more specifically, to a secondary electric circuit system and method.

BACKGROUND OF THE INVENTION

In numerous and varied applications, primary electric circuits are selectively activated by selective supply of electric power. Such selective activation may be accomplished by a switch, such as a mechanical, electric, magnetic, optical or other switch. Often times, when a primary electric circuit is activated, more electric power is conveyed to the circuit than is necessary for proper operation. Unfortunately, such excess power is wastefully diverted to a ground instead of being stored or otherwise diverted to the primary, or an ancillary, application for subsequent use (i.e., as a recycled power source).

Therefore, it is readily apparent that there is a need for a secondary electric circuit and associated power storage system, wherein any excess power, unused by an electrically-activated primary circuit, is stored or otherwise harnessed, and, thereafter, diverted for use by the secondary electric circuit of an adjunct electric system, or the like. Accordingly, the present invention seeks to advantageously utilize this excess, and otherwise traditionally wasted, electric power as a "recycled" power source.

BRIEF SUMMARY OF THE INVENTION

Briefly described, in a preferred embodiment, the present invention overcomes the above-mentioned disadvantages and meets the recognized need for such a secondary electric circuit system and method by providing a secondary electric circuit system that accumulates and stores excess electric power from a primary electric circuit system during activation of an electric device of the primary circuit system for subsequent beneficial use in powering an electric device thereof.

According to its major aspects and broadly stated, the present invention in its preferred form is a secondary electric circuit system and method, generally comprising a means for storing electric power supplied to a primary electric circuit during activation thereof, and a control means selectively operable to discharge electric power from the storage device through at least one secondary electric device.

Specifically, in one selected embodiment, the invention takes the form of a brake light including an ancillary illumination device and circuit that draws power from the brake light. The ancillary illumination circuit is preferably connected to a switched power supply of a brake light circuit via a steering device, such that electric power flows to the secondary illumination circuit, where it is preferably stored on a storage device, when the brake light is activated. The power stored on the storage device is preferably selectively discharged through one or more banks of lamps according to a predetermined pattern when the brake light is deactivated, thereby creating a desired visual illumination display using recycled or diverted electric power that would otherwise be wasted.

The steering device, as a safety feature, preferably prevents discharge of electric power stored on the storage device through the brake light circuit, thereby preventing unwanted or accidental activation of the brake light. Additionally, a shunting circuit is preferably included in the secondary illumination device circuit which, over time, drains electric power stored on the storage device to prevent unwanted discharge. As a further safety feature, the secondary illumination circuit preferably defaults to an inactive state whenever the brake light is activated to prevent simultaneous activation of the brake light and the secondary device.

According to another aspect of the preferred embodiment, a steering device is connected between the storage device and the switched power supply to prevent discharge of power stored on the storage means through the primary circuit, thus preventing unwanted activation thereof.

According to yet another aspect of the preferred embodiment, the control means selectively discharges electric power from the storage device through the at least one electric device only when sufficient power is stored on the storage means, when the power supply of the primary circuit is switched off, or both. Thus, the secondary electric circuit system is preferably responsive to an activation state and/or a duration of activation of the primary circuit.

According to another aspect of the preferred embodiment, the set pattern of the secondary electric circuit is sequenced by the voltage level of the stored charge.

According to another aspect of the preferred embodiment, as the power stored on the storage device is used to power an electric device, the intensity of the output of the electric device preferably decreases over time to produce a fade effect.

According to another aspect of the preferred embodiment, all power being supplied to an electric device from the storage means is cut off when the power supply of the primary circuit is switched on so as to prevent simultaneous activation of the primary and secondary circuits.

According to another aspect of the preferred embodiment, the primary circuit is a vehicle brake light circuit, wherein application of the brakes charges the storage device for subsequent activation of the secondary circuit system when the brakes are released.

According to another aspect of the preferred embodiment, the electric device is one or more illumination device and activation thereof produces a desired visual display.

In an alternative embodiment of the present invention, a method of powering a secondary circuit preferably includes the steps of connecting an electric power storage device to a switched power supply of a primary circuit, storing electric power on the electric power storage device when the power supply of the primary circuit is switched on, sensing when the power supply of the primary circuit is switched off, sensing a value corresponding to an amount of power stored on the electric power storage device, comparing the sensed value of power with a threshold value, and discharging power from the electric power storage device through a secondary circuit. Thus, reclaimed or recycled electric power is harnessed to power the secondary circuit.

According to another aspect of the preferred embodiment, power is discharged through the secondary circuit only when the sensed value of power is greater than the threshold value and only when the power supply of the primary circuit is switched off, thereby preventing simultaneous activation of the primary and secondary electric circuits.

According to another aspect of the preferred embodiment, the primary circuit is a vehicle brake light circuit, and the secondary circuit is an illumination circuit, whereby application of the brakes charges the storage device, and a desired visual display is created using recycled or reclaimed electric power when the brakes are released.

Accordingly, one feature and advantage of the present invention is its ability to provide a selectively activated secondary illumination device, wherein the selective activation is based on the activation status of a vehicle brake light circuit.

Another feature and advantage of the present invention is its ability to provide a temporary decorative, informational, or other illumination display or display pattern when a vehicle brake light circuit is switched off.

Another feature and advantage of the present invention is its ability to extinguish the illumination device or pattern of the secondary circuit when the vehicle brake light circuit is switched on, thereby preventing simultaneous activation of the primary and secondary illumination circuits.

Another feature and advantage of the present invention is its ability to provide an OEM brake light illumination device including an integrated decorative, informational, or other, secondary illumination circuit system.

Another feature and advantage of the present invention is its ability to provide a decorative, informational, or other display device including a secondary illumination circuit system capable of connection with, and accumulation of electric power from the operation of, an existing brake light illumination system without detrimental interference therewith.

These and other features and advantages of the present invention will become more apparent to those ordinarily skilled in the art after reading the following Detailed Description and Claims in light of the accompanying drawing Figures.

BRIEF DESCRIPTION OF THE DRAWINGS

Accordingly, the present invention will be understood best through consideration of, and reference to, the following Figures, viewed in conjunction with the Detailed Description of the Preferred Embodiment referring thereto, in which like reference numbers throughout the various Figures designate like structure and in which:

FIG. 1 is a perspective view of a secondary electric device according to the present invention;

FIG. 2 is an exploded view of the secondary electric device of FIG. 1;

FIG. 5 is a front view of a brake light including the secondary electric device of FIG. 1 during a primary electric device activation stage;

FIG. 6 is a front view of the brake light of FIG. 5 in a first secondary electric device activation stage;

FIG. 7 is a front view of the brake light of FIG. 5 in a second secondary electric device activation stage;

FIG. 8 is a front view of the brake light of FIG. 5 in a third secondary electric device activation stage; and FIG. 9 is a flow chart illustrating a method of operation of the secondary electric device of the present invention.

Figure 3:
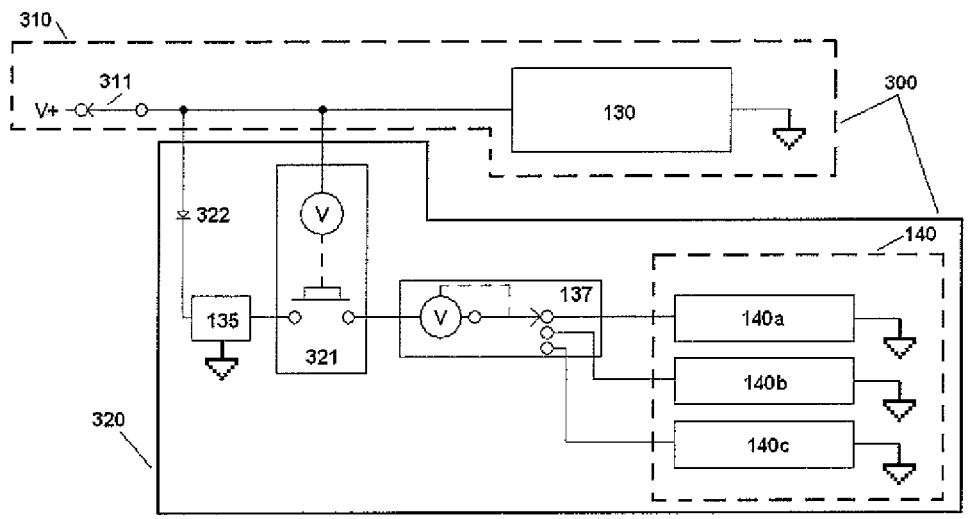
FIG. 3 is a plan view of a circuit diagram for the secondary electric device of FIG. 1 in a first charging mode.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

In that form of the preferred embodiment of the present invention chosen for purposes of illustration, FIGS. 1-2 show brake light assembly 100 preferably comprising housing 110, board 120, primary illumination devices 130, secondary illumination devices 140, and connector 150. Housing 110 is preferably designed to substantially enclose and protect board 120 and components mounted thereon, and is preferably formed of plastic or other suitable heat-resistant, water-resistant, and/or corrosion resistant material. Housing 110 preferably comprises shell 111 defining a substantially enclosed space in which board 120 and other components may be mounted. Housing 110 preferably further comprises face 113 operably connectable to shell 111, such as by insertion of fasteners 160 through flange 111a of shell 111 and into posts 113a of face plate 113. Face plate 113 is preferably formed of transparent or translucent material which may or may not have optical properties such as light dispersing, focusing, light diffusing, tinting, coloring, or other properties. Face plate 113 preferably allows a sufficient amount of light generated therebehind to pass therethrough such that illumination devices mounted behind face plate 113 (i.e. within shell 111) can be utilized as brake lights without departing from DOT regulations for such brake lights.

Board 120, such as a printed circuit board, is preferably attached to housing 110, such as by removable connection to posts 113b of face plate 113 via fasteners 160. Board 120 preferably carries one or more primary illumination device 130 and one or more secondary illumination device, such as an incandescent, fluorescent, LED, laser, neon, or other illumination device connected to board 120. Primary illumination device 130, preferably comprising a plurality of LEDs 131, is preferably electrically connected to a vehicle power supply (not shown), such as a battery and/or alternator, via connector 150 connected to plug 139. Secondary illumination device 140, preferably comprising a plurality of LEDs 141, is preferably electrically connected to electric power storage device 135, such as a battery, a capacitor, an inductor, or other electric power supply, via embedded or printed conductive paths. Preferably, electric power storage device 135 comprises a capacitor. Board 120 preferably further comprises controller 137 for selectively activating secondary illumination device 140 by selectively discharging electric power stored on electric power storage device 135 through secondary illumination device 140.

Figure 4:
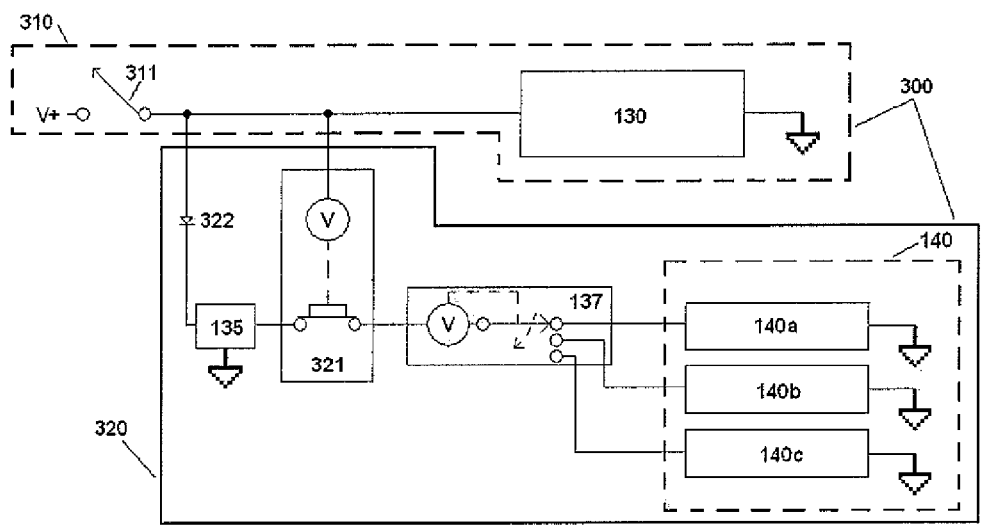
FIG. 4 is a plan view of the circuit diagram of FIG. 3 in a second active mode.

Now referring to FIGS. 3-4, board 120 preferably includes circuit 300 formed thereon. Circuit 300 preferably comprises primary brake light illumination circuit 310 and secondary illumination circuit 320. Primary brake light illumination circuit 310 preferably complies with all applicable regulations, including DOT regulations for operation of the brake lights of a motor vehicle, and preferably includes brake light switch 311 for selectively connecting primary brake light illumination circuit to electric power supply V+ or to an open circuit. When switch 311 is in the "ON" position, i.e. when switch 311 connects electric power supply V+ to primary brake light illumination circuit 310, electricity preferably flows through primary illumination device 130, preferably in the form of an LED array brake light device, to activate primary illumination device 130, such as by causing red LEDs to shine. Additionally, when switch 311 is in the "ON" position, electric power preferably flows through steering device 322, such as a diode, and is preferably accumulated and stored on electric power storage device 135. Electric power storage device 135 is preferably configured such that a predetermined amount of electric power is accumulated and stored thereon after only a short time of activation of primary illumination device 130.

When switch 311 is switched to the "off" position, i.e. when switch 311 connects primary illumination device 130 to an open circuit, a threshold switch that senses voltage 321 may detect a loss of primary circuit voltage and preferably connects charge accumulated on storage device 135 to controller 137. Controller 137 preferably selectively distributes electric power from electric power storage device 135 to one or more of banks 140a, 140b, and 140c of secondary illumination device 140. Such selective distribution of electric power is preferably determined by the level of charge (as voltage) available on the electric power storage device 135.

Controller 137 may distribute electric power to secondary illumination device 140, at least in part, according to a program. One exemplary program contains instructions readable by controller 137 to activate selected ones of a plurality of LEDs to create a display corresponding to a selected icon, such as a logo, mascot, or the like, of a desired sports team, educational institution, state, nationality, or the like. The program may further include additional instructions, such as how to activate such selected ones of a plurality of LEDs. For example, the program may instruct controller 137 to activate selected LEDs for a predetermined amount of time, in a predetermined sequence or combination, with a predetermined intensity, with a predetermined color, or the like. The program may be stored within controller 137 or on any suitable storage medium. As such, one or more programs may be stored and accessed selectively, randomly, sequentially, alternatingly, or the like. Thus, a image, icon, logo, mascot, or the like may be replaced, supplemented, or combined with alternative or additional icons, logos, mascots, or the like created by additional, alternative, or combined programs. Such programs are preferably provided by owners or licencees of the designs, patterns, images, logos, mascots, names, or the like, such as by download from the internet of a program, available on a free or pay basis. Controller 137 preferably distributes electric power to illumination device 140 based on the voltage remaining in electric power storage device 135. Threshold Switch 321 is preferably operably coupled to primary illumination device 130 such that when primary illumination device is activated, switch 321 is set to the "off" position, whereby no electric power may flow from electric power storage device 135 to controller 137. Such coupling may be accomplished by detecting the primary circuit voltage such that when primary circuit voltage is present, the threshold switch 321 is set to "OFF". Thus, switch 321 ensures that secondary illumination device 140 is not activated whenever primary illumination device 130 is activated. When primary circuit voltage is removed, switch 321 biases to "ON", closing the connection between electric power storage device 135 and controller 137. Upon the deactivation of the primary electric circuit, the accumulated charge is routed to controller 137 and utilized until charge exhaustion, or until such time as the primary circuit is again activated, whichever occurs first. This provides for a bright flash of the secondary illumination device, followed by a fade or "ghost" effect until the power is dissipated. Electric power storage device 135 is preferably additionally connected to ground through resistor 340, or other suitable charge dissipating or bleeding device. Thus, if electric power is accumulated and stored on electric power storage device 135 but is not distributed, e.g. because brakes are re-applied causing switch 321 to prevent secondary illumination device 140 from being activated, such accumulated and stored charge will safely dissipate or bleed off, thereby preventing unwanted accumulation of electric power and reducing the risk of electric shock or malfunction.

Referring now to FIGS. 5-8, when switch 311 is switched to the "on" position, such as when a brake pedal is depressed, red LEDs 510 of primary illumination circuit 130 are preferably activated, thereby producing bright red light to indicate that brakes are being applied. When switch 311 is switched to the "off" position, such as when the brake pedal is released, switch 321 is preferably switched to the "on" position, allowing electric power to flow from electric power storage device 135 to controller 137. As discussed above, controller 137 preferably selectively distributes electric power to banks 140a, 140b, and/or 140c.

Now referring to FIG. 9, method 900 of operation of an electric device including a secondary circuit preferably begins with step 901 in which a primary electric circuit is switched "on", thereby allowing electric power to reach a primary electric device, activating a primary electric device. While the primary device is activated, a storage device preferably accumulates and stores electric power in step 903. At step 905 the primary electric device is preferably switched "off", thereby preventing electric power from reaching the primary electric device, thereby deactivating the primary electric device, as well as preferably preventing further accumulation and storage of electric power on the storage device. An amount of electric power stored, such as a voltage, is then measured at step 907. The measured amount of electric power is then preferably compared to a first threshold value at step 911 to determine how to distribute the electric power stored on the storage device. If the measured amount of power is greater than the first threshold value, then the method proceeds to step 913, wherein at least a portion of a secondary electric device is activated, such as a first bank of lights. The first bank of lights is preferably activated until a predetermined amount of time has passed, determined, for example, by comparing an elapsed time to a threshold at step 915. When the elapsed time reaches the threshold, the method preferably activates a different portion of the secondary device, such as a second bank of lights, or activates a tertiary electric device at step 917. Preferably, the first bank of lights is deactivated at step 917. A similar comparison is then conducted at step 919 to determine whether a predetermined amount of time has passed. When the predetermined amount of time has passed, the second bank of lights is preferably deactivated and another different portion of the secondary device, such as a third bank of lights, or a quaternary electric device is preferably activated at step 921. The third bank of lights is preferably activated until it is determined at step 923 that a predetermined amount of time has passed. The method then preferably ends at step 925.

If, at step 911, it is instead determined that the measured amount of electric power is less than the first threshold, then the method preferably determines whether the stored amount of power is more than a second, lower, threshold at step 951. If the measured value is greater than the second threshold, then the method preferably goes to step 917. If the measured value is lower than the second threshold, the measured value is preferably compared to a third, even lower, threshold at step 953. If the measured value is greater than the third threshold, then the method preferably goes to step 921. If the measured value is less than the third threshold, the method preferably ends at step 925.

According to one embodiment, controller 137 preferably first distributes electric power to bank 140a to light yellow LEDs 520. Controller 137 preferably reduces an amount of power distributed to bank 140a over time in order to produce a fade effect, whereby the intensity of yellow light emitted by yellow LEDs 520 is reduced over time. After a predetermined decay in stored charge controller 137 preferably ceases to distribute electric power to bank 140a and begins to distribute electric power to bank 140b to activate green LEDs 530. Controller 137 preferably similarly reduces an amount of electric power distributed to bank 140b over time in order to produce a fade effect, whereby the intensity of green light emitted by green LEDs 530 is reduced over time.

According to an alternative embodiment, when switch 321 is switched to the "on" position, controller 137 preferably distributes electric power from electric power storage device 135 to bank 140c to activate blue LEDs 540. Controller 137 preferably reduces an amount of electric power distributed to bank 140c over time to produce a fade effect, whereby an intensity of blue light emitted by blue LEDs 540 is reduced over time.

It will be understood that controller 137 may distribute electric power according to alternative patterns, which may involve activation of one or more banks of LEDs in sequential order, simultaneously, or combinations thereof. Additionally, one or more LEDs in a bank may be activated in sequentially order, simultaneously, or combinations thereof, such as to form a desired image. The LEDs may also be activated repeatedly, such as in a blinking pattern, and may be varied in intensity, such as faded as described above, as well as increased in intensity over time. Optionally, multi-color LEDs may be used, and controller may distribute electric power thereto so as to produce a pre-selected color, a random color, or to produce changes in the color over time. As stated above, the illumination devices of the primary electric device and/or the secondary electric device need not take the form of LEDs, but may alternatively take the form of one or more incandescent lamp, laser, fluorescent lamp, neon lamp, halogen lamp, an LCD display or other display, or the like.

Although the invention has been illustrated using an exemplary brake light with primary and secondary illumination devices, it will be understood that secondary electric device may be included in varied primary electric devices. The primary electric device may be virtually any electric device, such as, for example, a household electric device (such as a lamp, a radio or stereo, a television, an appliance, or the like), a personal electric device (such as a portable phone (e.g. a cell phone), a portable music player, a watch, a laptop computer, or the like), or any other similar electric device that has a switched power supply, whereby power can be accumulated and stored while the power supply is switched on. Similarly, the secondary electric device need not be an illumination device, but may alternatively be an audio device, a motor for causing motion, a text and/or visual display, or any other suitable electric device that may be advantageously activated upon the deactivation of the primary electric device.

Having, thus, described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein, but is only limited by the following claims.

The invention claimed is:

1. A vehicle brake light having a secondary personalized illumination display comprising:
    a primary illumination circuit for indicating application of a brake of the vehicle wherein application of the brake causes activation of at least one illumination device of said primary illumination circuit; and
    a secondary illumination circuit connected to said primary illumination circuit, said secondary illumination circuit for illuminating said secondary personalized illumination display and comprising:
    (i) at least one personalized illumination device;
    (ii) an electric power storage device configured to store electric power accumulated during activation of said primary illumination circuit;
    (iii) a voltage sensor configured to sense voltage applied to the primary illumination circuit during activation of at least one illumination device of said primary illumination circuit; and
    (iv) a switch connected to the voltage sensor; wherein the voltage sensor outputs a signal corresponding to the voltage being applied to the primary illumination circuit and wherein the switch opens according to the signal to prevent the flow of power from the electric power storage device, thereby preventing electric power from reaching the personalized illumination display during activation of the primary illumination circuit, and wherein the switch closes when voltage is not applied to the primary illumination circuit.

2. The vehicle brake light of claim 1, wherein said personalized illumination device of said secondary illumination circuit comprises a plurality of light emitting diodes arranged in an iconic pattern.

3. The vehicle brake light of claim 1, further comprising a connector adapted to connect to a power supply of the vehicle, wherein electric power is supplied to said primary illumination circuit via said vehicle power supply.

4. The vehicle brake light of claim 1, further comprising a steering device for preventing activation of said at least one illumination device of said primary illumination circuit by said electric power storage device.

5. The vehicle brake light of claim 2 wherein the iconic pattern does not provide information relating to operation of the vehicle.

6. The vehicle brake light of claim 1 wherein the brightness of the personalized illumination device fades as the electric charge of the electric power storage device is reduced.

7. The vehicle brake light of claim 1 wherein the personalized illumination device comprises a plurality of illumination devices in electrical communication with the electric power storage device, and wherein electric power is distributed to the illumination devices in a sequential order based upon the amount of electric charge remaining in the electric power storage device.

8. The vehicle brake light of claim 7 further comprising means for sensing the voltage of the electric charge and utilizing that sensed voltage to distribute power to the plurality of illumination devices.

9. The vehicle brake light of claim 8 wherein the brightness of each of the plurality of illumination devices fades as the electric charge of the power storage device is reduced.

10. The vehicle brake light of claim 1 wherein the switch is located between the electric power storage device and the personalized illumination device.

11. A method for illuminating a personalized light display on an automotive vehicle utilizing electric power accumulated from use of a vehicle brake light, said method comprising:

(a) providing a primary illumination circuit comprising an electric power source, a brake switch, and at least one brake light, wherein applying the brakes of the vehicle causes the brake switch to close thereby providing electric power to the at least one brake light;

b) providing a secondary illumination circuit connected to the primary illumination circuit, said secondary illumination circuit for illuminating said personalized light display comprising:

(i) at least one personalized illumination device;

(ii) an electric power storage device configured to store electric power accumulated during activation of said primary illumination circuit;

(iii) a voltage sensor configured to sense whether voltage has been applied to the primary illumination circuit; and (iv) a switch connected to the sensor so that the switch is closed when the sensor does not detect voltage in the primary circuit and open when the sensor detects voltage in the primary circuit;

(c) applying the brakes of the vehicle to close the brake switch thereby activating the primary circuit;

(d) sensing the presence of voltage in the primary circuit thereby causing the switch of the secondary circuit to open;

(e) charging the electric power storage device while the primary circuit is activated;

(f) releasing the brakes of the vehicle to open the brake switch and deactivate the primary circuit;

(g) sensing the lack of voltage in the primary circuit and thereby causing the switch of the secondary circuit to close; and (h) utilizing the electric power stored in the storage device to illuminate the personalized light display;

wherein the personalized light display is designed to glow brightly and then fade based upon the amount of voltage available from the electric power storage device.

12. The method of claim 11 wherein the personalized illumination display comprises a user-selected personalized image.

13. The method of claim 12 wherein the image is an iconic image.

14. The method of claim 13 wherein the image is decorative and does not provide information relating to operation of the vehicle.

15. The method of claim 12 wherein the personalized light display comprises a plurality of illumination devices, and wherein electric power is distributed to the illumination devices in a sequential order based upon the amount of voltage remaining in the electric power storage device.

* * * * *